UNITED STATES PATENT OFFICE.

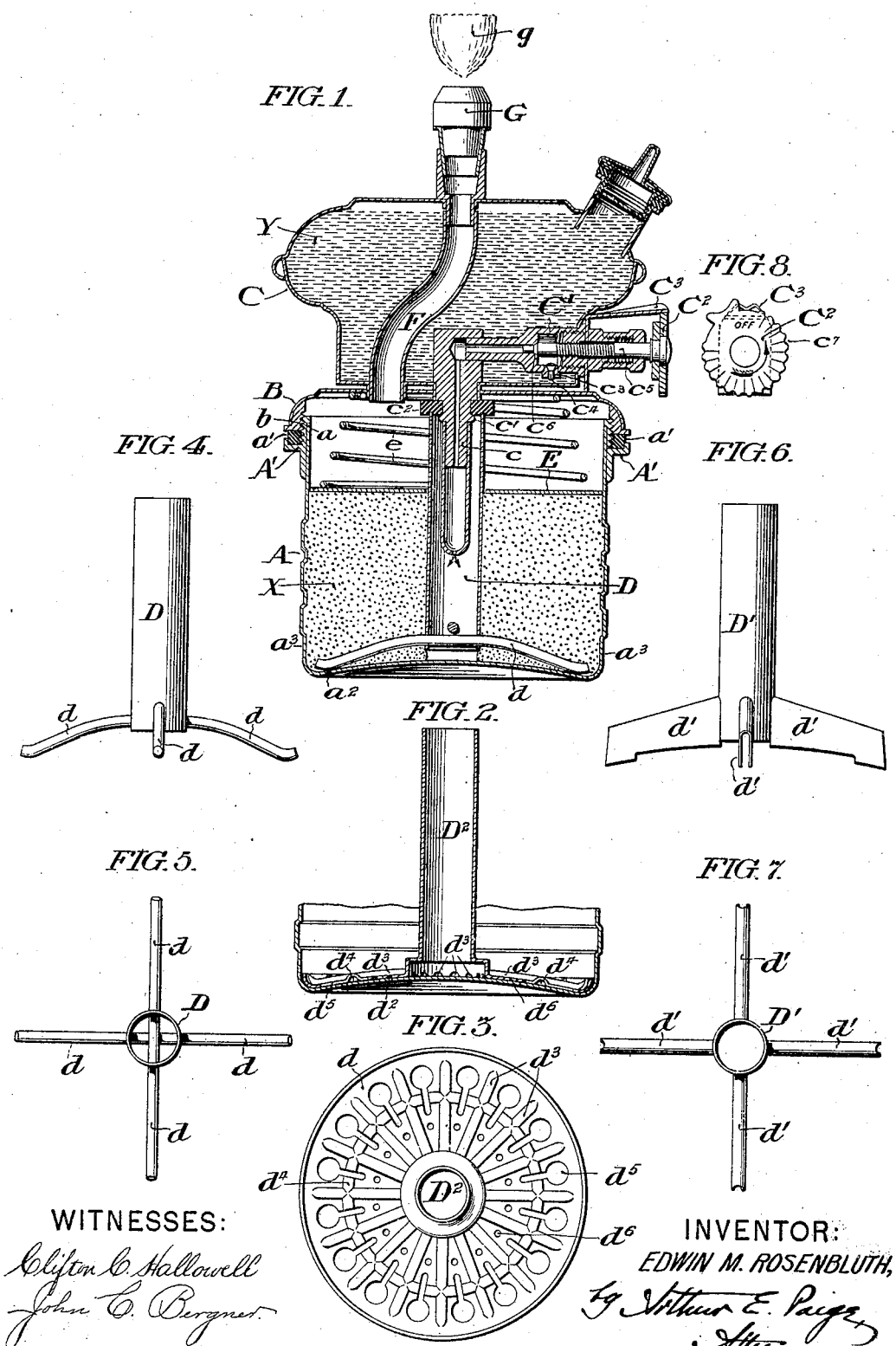

EDWIN M. ROSENBLUTH, OF PHILADELPHIA, PENNSYLVANIA.

ACETYLENE-GAS GENERATOR.

No. 844,047.  Specification of Letters Patent.  Patented Feb. 12, 1907.

Application filed April 29, 1901. Serial No. 57,933.

*To all whom it may concern:*

Be it known that I, EDWIN M. ROSENBLUTH, of Philadelphia, in the State of Pennsylvania, have invented certain new and useful Improvements in Acetylene-Gas Generators, whereof the following is a specification, reference being had to the accompanying drawings.

My present improvements are particularly applicable to portable generators arranged for embodiment in vehicle-lamps and to the class wherein the supply of water gravitates to the supply of carbid.

It is the object of my invention to provide a device wherein gas may be intermittently generated from a single charge of carbid until such charge is entirely consumed, so that regardless of the extent of intermission and even when the charge of carbid is partially decomposed the generation of gas may be instantly resumed at the will of the operator.

My invention comprises means to spread a supply of water over a large area of the wall inclosing the carbid-chamber, thereby insuring instant contact of the water with the carbid, utilizing the external atmosphere in maintaining the water at a low temperature until its actual contact with the carbid and also utilizing the capillarity of said wall in delivering water to the carbid.

My invention also comprises means to render dustproof the water-conduit extending within the carbid-chamber, so that regardless of the vibration of the generator when attached to a vehicle the carbid will be at all times excluded from the water inlet and valve and the connections leading thereto.

My invention consists of the novel arrangement and construction of elements hereinafter more definitely specified and claimed.

In the accompanying drawings, Figure 1 is a vertical sectional view of a gas-generator lamp conveniently embodying my improvements. Fig. 2 is a fragmentary vertical sectional view of a carbid-chamber, showing a modified form of water-column applied thereto. Fig. 3 is a plan view of the water-column shown in Fig. 2. Fig 4 is the side elevation of the water-column shown in Fig. 1. Fig. 5 is a plan view of the water-column shown in Fig. 4. Fig. 6 is a side elevation of a modified form of water-column. Fig. 7 is a plan view of the water-column shown in Fig. 6. Fig. 8 is a detailed view showing means for retaining the water-valve in predetermined position.

Referring to Fig. 1, the carbid-chamber A is provided with a cap B, upon which is fixed the water-chamber C. Said carbid-chamber A is provided with an annular flange A' at its top, which serves to retain the gasket $a'$, which is compressed to seal the joint between the carbid-chamber A and its cap B by the engagement of the screw-thread $a$ of the carbid-chamber with the screw-thread $b$ of said cap. The hollow column D, which is provided at its lower extremity with the radial water-feeders $d$, is centrally located in said chamber A, with its top in registry with the water-inlet tube $c$, which extends from the bottom of the water-chamber C and forms, with the said column D, a duct arranged to deliver water from said chamber C radially outward at the bottom of the said carbid-chamber to the floor $a^2$ thereof and in contact with the mass of carbid X in said chamber, said floor $a^2$ being preferably inclined downwardly toward its periphery to facilitate the distribution of the water. The water-inlet tube $c$ being provided with the annular flange $c'$ serves to retain the gasket $c^2$ in position to seal the top of the column D in dustproof relation with said tube when the parts are assembled as shown in Fig. 1. Said inlet-tube $c$ receives water from the chamber C through the port $c^3$, which latter is normally opened by the water in the chamber C, but may be closed automatically by the check-valve $c^4$ when the back pressure of gas within the generator exceeds said water-pressure. The rate of delivery of the water Y from the chamber C to the water-column D may be precisely predetermined by the set of the valve $c^5$ with respect to its seat $c^6$ in the valve-casing C', said valve $c^5$ being provided with a head $C^2$, arranged to be retained in adjusted position by the engagement of the spring-detent $C^3$ in any selected notch $c^7$ of said head. Water delivered at a predetermined rate through the inlet-tube $c$ by the means above described gravitates through the column D to the floor $a^2$ of said chamber A and is distributed equally through the mass of carbid X by the capillarity of the radial feeders $d$ of the floor $a^2$ and of the outer wall $a^3$ of said chamber.

I find that the generation of gas is facilitated if the charge of carbid X is compressed in intimate contact with the floor $a^2$ of the carbid-chamber A, and for this purpose I provide the diaphragm E, whose spring $e$ abuts against the lid B and is gradually compressed as the carbid expands in the process of decomposition and raises said diaphragm. The generated gas rises through the mass X to the top of the chamber A and, escaping therefrom through the gas-tube F and the burner G, may be consumed in the flame $g$. The quantity of gas generated is of course determined by the quantity of water admitted to the mass X, which quantity may be varied and precisely determined by rotation of the valve-head $C^2$ in one direction or the other.

The device above described may be conveniently utilized as follows: The chamber A being charged with carbid X and the chamber C being charged with water Y, the normal position of the device is with the head $C^2$ of the valve $c^5$ rotated to the "off" position indicated in Fig. 8, in which position said valve is closed upon its seat $c^6$, as shown in Fig. 1. The generation of gas may be initiated by rotation of said head $C^2$ in the direction of the arrow marked thereon in Fig. 8, thereby opening valve $c^5$ and admitting the water Y through the valve-casing C', inlet-tube $c$, and the water-column D to be distributed by the feeders $d$, &c., to the carbid, as above described. The carbid X having been consumed, the carbid-chamber A may be released from its threaded engagement with the lid B and removed therefrom, together with the diaphragm E. The ashy residue of the carbid X may then be loosened from the chamber A conveniently by a knife cut circumscribing the mass X adjoining the wall $a^3$. Said residue being removed from the chamber A, a fresh charge of carbid may be packed upon the floor $a^2$, surrounding the column D, and the diaphragm E being placed within the chamber A surrounding the column D the parts may be restored to their assembled position, as shown in Fig. 1.

The feeders $d$ (shown in Figs. 1, 4, and 5) are cheaply and conveniently constructed of solid wire entered through apertures in the opposite sides of the column D in crossed relation, as best shown in Fig. 5, whereby they serve as a screen to exclude the carbid from the bottom of the column D. The precise shape of the radial feeders at the bottom of the water-column is immaterial, provided that they are in such communication with the water-supply as to transmit the same uniformly to the carbid. For instance, the column D' (shown in Figs. 6 and 7) may be provided with radial feeders $d'$ of inverted-U-shaped cross-section, which form affords a larger extent of surface for the capillary distribution of the water received from the column D' than is afforded by the feeders $d$ aforesaid.

I have shown a further modification of my invention in Figs. 2 and 3, wherein the column $D^2$ is provided at its bottom with a flange $d^2$, comprising radial feeders $d^3$, which are of inverted-U-shaped cross-section similar to the feeders $d'$, but of less depth. I also find it advantageous to connect the feeders $d^3$ by an annular channel $d^4$, which serves to further equalize the distribution of water therefrom. In the latter form of my invention the water delivered by the feeders $d^3$ finds access to the superimposed mass of carbid through the apertures $d^5$ and $d^6$.

I am aware that it is old in generators of the general class specified to provide a mass of carbid with a centrally-located water-column; but, as far as I am aware, such columns of the prior art have been in open communication with the carbid at the top thereof. The vibration of such a device when attached to a vehicle causes the dust from the charge of carbid to fall within the open column aforesaid and not only obstruct the passage of the water, but after a short period of use render the water-valve inoperative by corrosion of the parts connected therewith. Therefore my improved construction is advantageous in that although the water-column may be removed readily it is normally secured in dustproof relation with the water-inlet, and the entire water-conduit is so arranged that the carbid is at all times excluded therefrom. Moreover, in the aforesaid devices of the prior art the water is delivered locally at the center of the carbid mass and becomes heated before its actual contact therewith, whereas in my improved construction the water is delivered to the carbid by the radial feeders in such conjunction with the floor of the carbid-chamber as to be fractionated over a large area of the wall exposed to the outer atmosphere, and the water is thus maintained at the lowest temperature possible until its actual contact with the carbid.

The capillarity of the feeding-surfaces arranged in contact with the carbid as above described is such that even if the carbid is almost entirely decomposed some active portion of it will be instantly reached by the supply of water directed thereto after an intermission in the generation of gas, even when the carbid has been partially decomposed and subsequently dried. Therefore a vehicle-lamp provided with my improved generator may be repeatedly extinguished and relighted with the same facility as an oil-burner.

I do not desire to limit myself to the precise arrangement or construction of my invention which I have herein set forth, as it is obvious that various modifications may be made therein without departing from the essential features of my invention.

I claim—

1. In an acetylene-gas generator, the combination with a carbid-chamber; of a removable lid for said chamber; a water-chamber fixed upon said lid; a detached and removable water-column within said carbid-chamber; radial feeders extending from the bottom of said column; a water-inlet tube, extending from said water-chamber through said carbid-chamber lid, in registry with said water-column; and resilient means to engage said column in dustproof relation with said inlet-tube, substantially as set forth.

2. In an acetylene-gas generator, the combination with a carbid-chamber; of a water-chamber above said carbid-chamber; a water-column open at its bottom and arranged to deliver water from said water-chamber to the bottom of said carbid-chamber; and water-feeders carried by said column and extending radially therefrom within and in contact with the carbid mass, adjacent to the floor of the carbid-chamber, substantially as set forth.

3. In an acetylene-gas generator, the combination with a carbid-chamber; of a water-chamber above said carbid-chamber; a removable water-column arranged to deliver water from said water-chamber to the bottom of said carbid-chamber; and water-feeders carried by said column, supported by the floor of the carbid-chamber, and comprising channels extending radially from the bottom of said column within the carbid mass, adjacent to the floor of said carbid-chamber, substantially as set forth.

4. In an acetylene-gas generator, the combination with a carbid-chamber; of a removable lid for said chamber; a water-chamber fixed upon said lid; a detachable water-column within said carbid-chamber; radial feeders extending from the bottom of said column; a water-inlet tube extending from said water-chamber through said carbid-chamber lid in registry with said water-column, and comprising a detachable nozzle with a restricted outlet; a resilient gasket arranged on said inlet-tube to engage said column in dustproof relation therewith; and, means on said tube arranged to normally prevent removal of said gasket, substantially as set forth.

5. In an acetylene-gas generator, the combination with a carbid-chamber; of a removable lid for said chamber; a water-chamber fixed upon said lid; a detached water-column within said carbid-chamber; radial feeders extending from the bottom of said column; a water-inlet tube extending from said water-chamber through said carbid-chamber lid in registry with said water-column; resilient means arranged to engage said column in dustproof relation with said inlet-tube; and, a valve arranged to control communication between said inlet-tube and said water-chamber, substantially as set forth.

6. In an acetylene-gas generator, the combination with a carbid-chamber; of a removable lid for said chamber; a water-chamber fixed upon said lid; a detached water-column within said carbid-chamber; radial feeders extending from the bottom of said column; a water-inlet tube extending from said water-chamber through said carbid-chamber lid in registry with said water-column; resilient means arranged to engage said column in dustproof relation with said inlet-tube; and, a check-valve arranged to automatically control communication between said inlet-tube and said water-chamber, substantially as set forth.

7. In an acetylene-gas generator, the combination with a carbid-chamber; of a removable lid for said chamber; a water-chamber fixed upon said lid; a detached water-column within said carbid-chamber; radial feeders extending from the bottom of said column; a water-inlet tube extending from said water-chamber through said carbid-chamber lid in registry with said water-column; resilient means arranged to engage said column in dustproof relation with said inlet-tube; a check-valve arranged to automatically control communication between said inlet-tube and said water-chamber; and, a manually-operative valve arranged to control communication between said check-valve and said water-column, substantially as set forth.

8. In an acetylene-gas generator, the combination with a carbid-chamber; of a removable lid for said chamber; a water-chamber fixed upon said lid; a detached water-column within said carbid-chamber; radial feeders extending from the bottom of said column; a water-inlet tube extending from said water-chamber through said carbid-chamber lid in registry with said water-column and comprising a detachable nozzle with a restricted outlet; a resilient gasket arranged on said inlet-tube to engage said column in dustproof relation therewith; means on said tube arranged to normally prevent removal of said gasket; a check-valve arranged to automatically control communication between said inlet-tube and said water-chamber; and, a manually-operative valve arranged to control communication between said check-valve and said restricted outlet, substantially as set forth.

9. In an acetylene-gas generator, the combination with a carbid-chamber; of a removable lid for said chamber; a water-chamber fixed upon said lid; a detached and removable metallic water-column within said carbid-chamber; radial metallic feeders extending from the bottom of said column in integral relation therewith; a water-inlet tube, extending from said water-chamber through said carbid-chamber lid in registry with said water-column; and, resilient means arranged to engage said column in dust-proof relation with said inlet-tube, substantially as set forth.

10. In an acetylene-gas generator, the combination with a carbid-chamber; of a removable lid for said chamber; a water-chamber fixed upon said lid; a gas-tube extending through said water-chamber and lid, connecting them in rigid relation; a metallic water-column within said carbid-chamber; radial metallic feeders extending from the bottom of said column in integral relation therewith; and, means arranged to supply said column with water from said water-chamber, substantially as set forth.

11. In an acetylene-gas generator, the combination with a carbid-chamber; of a water-chamber fixed upon said carbid-chamber; a gas-tube extending through said water-chamber and lid, connecting them in rigid relation; a detached and removable water-column within said carbid-chamber and radial metallic feeders extending from the bottom of said column in integral relation therewith; and, means arranged to supply said column with water from said water-chamber, substantially as set forth.

In testimony whereof I have hereunto signed my name, at Philadelphia, Pennsylvania, this 27th day of April, 1901.

EDWIN M. ROSENBLUTH.

Witnesses:
 ARTHUR E. PAIGE,
 CLIFTON C. HALLOWELL.